April 16, 1935.  W. C. MOORE ET AL  1,997,974
ELECTRIC DRIVE FOR VEHICLES
Filed June 26, 1931  2 Sheets-Sheet 2

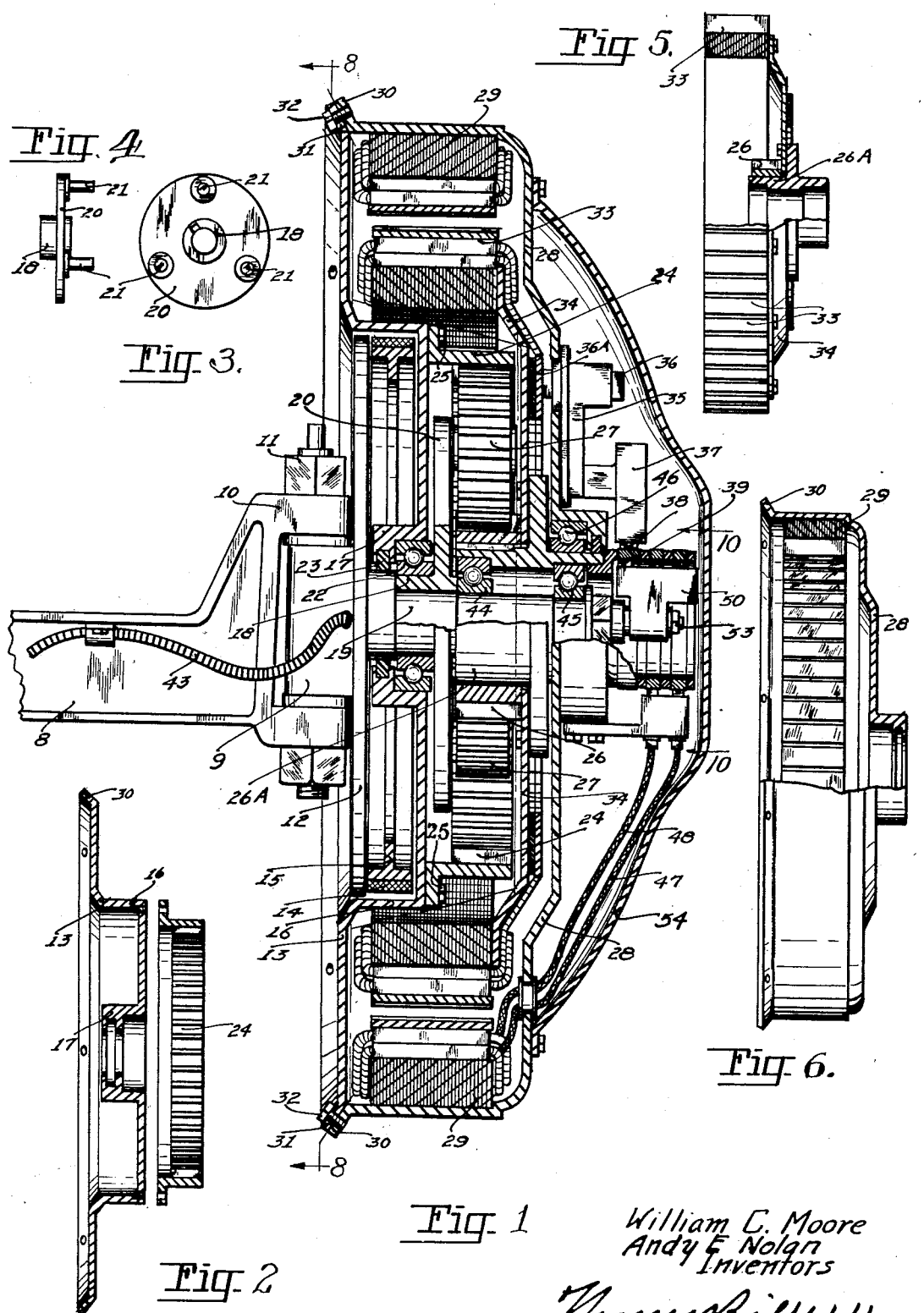

William C. Moore
Andy E. Nolan
Inventors

Thomas Biggers
Attorney

Patented Apr. 16, 1935

1,997,974

UNITED STATES PATENT OFFICE 1,997,974

ELECTRIC DRIVE FOR VEHICLES

William C. Moore and Andy E. Nolan,
Portland, Oreg.

Application June 26, 1931, Serial No. 547,033

3 Claims. (Cl. 172—287)

Our invention is primarily adapted for use upon automotive vehicles and is primarily adapted for use upon automobiles, motor trucks, buses, stages and certain classes of tractors.

It is primarily adapted for use upon motor vehicles wherein four wheel drives are disposed. We place within each wheel of the vehicle, upon which our device is attached, a complete electric prime mover, the armature element of which is adapted for being rotated. The field element also is adapted for rotation, the necessary brushes and other incidentals being secured to a stationary mounting placed upon the spindle of the wheel to facilitate the action. We place a control at any suitable location upon the vehicle, convenient to the operator thereof, the control being adapted for regulating electric current for driving each wheel, in the desired direction of rotation.

One of the objects of our invention is to uniformly distribute the driving torque upon each wheel of the vehicle to provide uniform traction.

A further object of our invention consists in providing a prime mover, in each wheel of the vehicle, that is adapted for developing the necessary torque for driving each wheel, the power being secured from a prime mover mounted upon the vehicle from a storage battery, or from a source of electric supply disposed outside of the vehicle, as from a trolley.

Through the use of our new and improved device the distribution of the driving energy is delivered to all of the four wheels. This eliminates much of the normal wear and tear of the tires that is encountered where a pair of driving wheels are being used, and where the total of the driving energy is to be absorbed by the tires of the two wheels.

A still further object of our invention consists in providing a vehicle through the use of which lighter tires may be used upon the driving wheels.

A still further object of our invention consists in providing a vehicle that may be driven at higher speeds than at present obtain.

A still further object of our invention consists in providing suitable rotating mechanisms that will act automatically as braking means when the weight of the vehicle tends to drive them, and to generate electric current that may be stored in the battery.

With these and incidental objects in view, the invention consists in certain novel features of construction and combination of parts, the essential elements of which are set forth in the appended claims, and a preferred embodiment of which is hereinafter shown with reference to the drawings which accompany and form a part of this specification.

In the drawings:

Fig. 1 is a vertical, sectional view of one of the wheels of the vehicle.

Fig. 2 is a fragmentary sectional side view of a part of the wheel structure, the same primarily comprising the inner web of the wheel and the internal gear that is secured thereto.

Fig. 3 is an outside view of a spider hub that is adapted for being fixedly and removably secured to the spindle of the wheel, shown removed from the wheel.

Fig. 4 is a side view of the mechanism illustrated in Fig. 3.

Fig. 5 is a front view, partially in section of the wheel armature and hub shown removed from the wheel.

Fig. 6 is a front view, partially in section of the outside web of the wheel and to the inside of which the motor field is secured.

Like reference characters refer to like parts throughout the several views.

Figure 7:
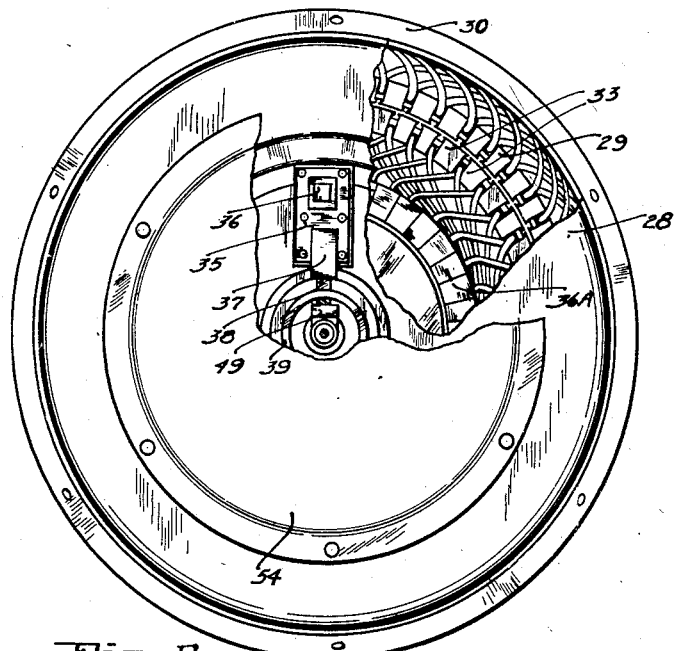
Fig. 7 is an outside view of the wheel with a part of the various casings broken away to show the coacting parts comprising the wheel.

For the purpose of this description we have assumed the wheel to be a front wheel and that the same is secured to the front axle 8. A spindle 9 is disposed within the axle head 10 and is secured thereto by a spindle bolt 11. The spindle has a closure plate 12 formed integral therewith, that acts as a closure for the internal brake compartment of the wheel.

Referring to Fig. 1, a flange 13 forms the inner surface of the wheel and an internal brake compartment is disposed within the central portion of the flange member 13. A suitable brake lining 14 is removably secured to the outer surface of an internal expanding brake member 15, and is adapted to frictionally engage the drum portion 16 of the wheel. A hub 17 forms the central portion of the flange 13.

Figure 9:
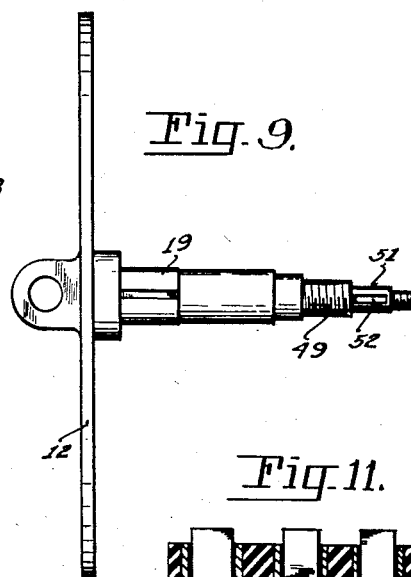
Fig. 9 is a front view of the spindle and disc shown removed from the axle.

Referring to Figs. 3 and 4, a spider hub 18 is fixedly positioned upon the shoulder 19 of the spindle as illustrated in Fig. 9. The same may be secured thereto as by being positioned thereupon and for being also keyed thereupon. A flange 20 outwardly extends from the hub and gear supporting pins 21, here shown as three in number, outwardly extend from the flange 20.

An anti-friction bearing 22 is disposed between the outer surface of the hub 18 and the inner surface of the hub 17, and forms a bearing therebetween. A felt washer 23 is disposed between the spindle and the inner surface of the hub 17 to maintain a leak proof connection between the spindle and the flanged inner surface 13 comprising one of the wheel housings. An internal gear 24 is removably secured to the inner flange member 13 and is secured thereto as through the use of fastening bolts 25.

Figure 8:
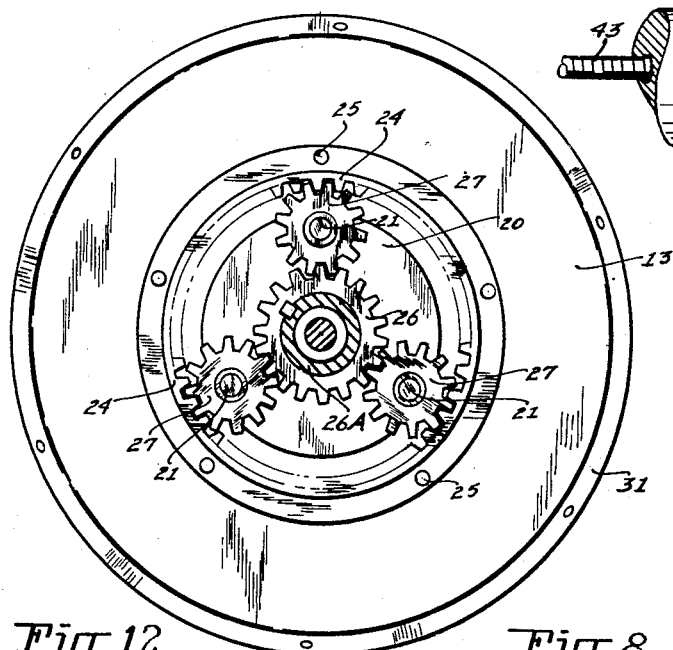
Fig. 8 is a sectional, end view of the assembled wheel, taken on line 8—8 of Fig. 1, looking in the direction indicated, and illustrating the gear drive assembly of the wheel.
Figure 10:
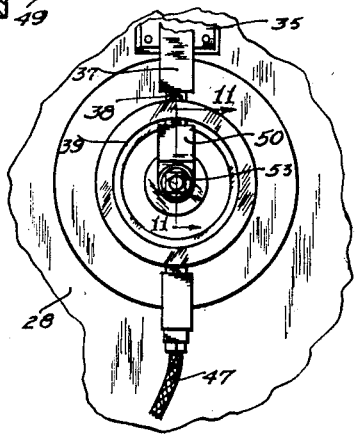
Fig. 10 is a fragmentary, sectional end view of the brush control mechanism illustrated in Fig. 1, being taken on line 10—10 of Fig. 1, looking in the direction indicated.
Figure 12:
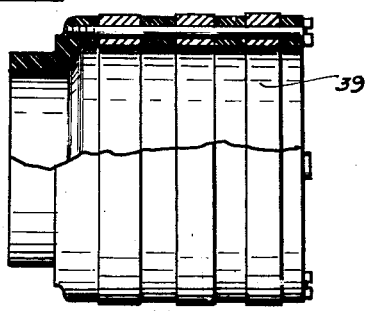
Fig. 12 is a top, plan view, partially in section of the collector ring disposed within the wheel assembly.

A sun pinion 26, as illustrated in Fig. 8, is fixedly positioned upon the hub 26A and a plurality of pinions 27, that are mounted upon the supporting pins 21 coact with the sun pinion 26 and the internal gear 24, and rotation is imparted to the internal gear 24 by the rotation of the respective gear members. A wheel and motor housing 28, illustrated in Fig. 6, is placeable about the wheel assembly and an electric field 29 is mounted upon the inner surface of the same.

A flange 30 is adapted to precisely fit the flange 31 and to secure the inner and outer wheel housings together. The flanges are secured together by any suitable fastening means, as through the use of fastening bolts 32. An electric field 29 is secured to the inner surface of the outer wheel housing 28 and the armature pole pieces 33 are adapted to coact with the field. The armature pole pieces are secured to a housing 34 by any suitable means, such for instance as bolts or the like (not here shown) passing through the wall of the housing 34 and through the pole pieces. A brush holder 35 is secured to the outer housing and the brushes 36 are positioned within the brush holder and are adapted to engage the commutator 36A. A second brush holder 37 is also formed upon the inner end of the brush holder and brushes 38 are positioned therein and are adapted to engage the collector ring 39.

Figure 11:
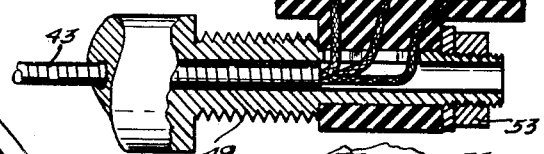
Fig. 11 is a fragmentary, sectional side view of the mechanism illustrated in Fig. 10, taken on line 11—11 of Fig. 10, looking in the direction indicated.

We prefer, as the prime mover for the generating of the electric current, an internal combustion engine, but we do not wish to be limited to internal combustion engines as other prime movers may be used. The electric current may be directly secured from trolley wires, or from a storage battery with equal facility. A distributor and control box is placed conveniently within the vehicle and is adapted for being manipulated by the operator of the vehicle. A storage battery is also carried upon the vehicle. The current, to be delivered into the wheel is conducted through any suitable conductor 43 passing longitudinally of the spindle, as illustrated in Fig. 11 and emerging from the outer end of the spindle, to the various collector rings.

The hub 26A is adapted to anti-friction bearings 44 and 45 that rest directly upon the spindle. Antifriction bearing 46 is disposed between the outer surface of the hub 26A and the flange support 28.

The control is disposed within the electric circuits for predetermining the direction of rotation of the drive within the wheels and of the wheels. The electric current is conducted to the collector rings and into the respective brushes through the circuits 47 and 48 that conduct the current to the field 29.

The outer end of the hollow spindle is threaded as illustrated at 49 and the collector brush block 50 is fixedly positioned upon that portion of the hollow spindle as illustrated at 51 and its rotation is prevented through the use of a spline 52, or through any other suitable medium. The entire assembly is maintained upon the spindle by a locking nut 53. A closure plate, or hub cap 54, maintains the entire wheel assembly in a dust proof condition.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What we claim is:

1. In a device of the class described, in combination with an axle, a hollow spindle secured to the axle by a spindle bolt, a flanged spider hub removably secured to the spindle, a closure plate rotatably mounted upon the spider hub and having a braking surface disposed integral therewith, said closure plate having a frusto-conical peripheral flange disposed about its major diameter, supporting pins outwardly extending from the flange of the spider hub, pinions disposed upon the supporting pins, an internal gear removably fixed to said closure plate and adapted to coact with said pinions, a housing forming a wheel rim adapted to receive traction means and having a frusto-conical peripheral flange disposed about an end of its cylindrical body and adapted to fixedly engage the frusto-conical peripheral flange of the closure plate, an electric motor field element secured to the inner periphery of the housing, a flanged quill rotatably mounted upon said spindle, an electric motor armature element mounted upon the flange of said quill and positioned in operative alignment with said field element, a sun gear fixed to said quill and coacting with said pinions, mutually insulated collector rings mounted upon said quill, a collector brush block fixed to said spindle, a commutator fixed to said armature element, conductor means fixed to said housing and connecting the armature element circuit with the corresponding collector ring, conductor means fixed to said housing and connecting the field element circuits with their corresponding collector rings, expansible brake means manipulatively coacting with said braking surface, a closure plate removably attached to said housing and shrouding both said conductor means, electric conductors disposed through said hollow spindle connecting a source of electric energy with said collector brush block.

2. In a device of the class described, in combination with an axle having a hollow spindle, a flanged spider hub removably secured to the spindle, a closure plate rotatably mounted upon the spider hub and having a braking surface disposed integral therewith, said closure plate having a frusto-conical peripheral flange disposed about its major diameter, supporting pins outwardly extending from the flange of the spider hub, pinions disposed upon the supporting pins, an internal gear removably fixed to said closure plate and adapted to coact with said pinions, a housing forming a wheel rim adapted to receive traction means and having a frusto-conical peripheral flange disposed about an end of its cylindrical body and adapted to fixedly engage the frusto-conical peripheral flange of the closure plate, an electric motor field element secured to the inner periphery of the housing, a flanged quill rotatably mounted upon said spindle, an electric motor armature element mounted upon the flange of said quill and positioned in operative alignment with said field element, a sun gear fixed to said quill and coacting with said pinions, mutually insulated collector rings mounted upon said quill, a collector brush block fixed to said spindle, a commutator fixed to said armature element, conductor means fixed to said housing and connecting the armature element circuit with the corresponding collector ring, conductor means fixed to said housing and connecting the field element circuits with their corresponding collector rings, expansible brake means manipulatively coacting with said braking surface, a closure plate removably attached to said housing and shrouding both said conductor means, electric conductors disposed through said hollow spindle connecting a source of electric energy with said collector brush block.

3. In a device of the class described, the combination of a hollow spindle, a flanged spider hub secured thereto, a closure plate rotatable about said spindle, an internal gear mounted upon said closure plate, a plurality of pinions mounted upon said flanged spider hub and coacting with said internal gear, a flanged quill rotatably mounted upon said spindle, a sun gear mounted upon said quill and coacting with said pinions, a housing rotatably mounted upon said quill and removably fixed at its outer periphery to said closure plate, and adapted to receive traction means, an electric motor field element mounted upon the inner peripheral surface of said housing, an electric motor armature element mounted upon the flange of said quill, conductors connected with a source of electric energy disposed within said hollow spindle, and means operatively connecting said electric conductors with the said electric motor armature element and field element.

WILLIAM C. MOORE.
ANDY E. NOLAN.